(12) United States Patent
Dusker et al.

(10) Patent No.: US 7,293,031 B1
(45) Date of Patent: Nov. 6, 2007

(54) REPORT SPECIFICATION GENERATORS AND INTERFACES

(75) Inventors: Eric D. Dusker, Atlanta, GA (US); Sreedhar Srikant, Marietta, GA (US); Karen A. Papierniak, Fenton, MI (US); Paul Cereghini, Escondido, CA (US)

(73) Assignee: NCR Corp., Dayton, OH (US)

( * ) Notice: Subject to any disclaimer, the term of this patent is extended or adjusted under 35 U.S.C. 154(b) by 375 days.

(21) Appl. No.: 10/300,993

(22) Filed: Nov. 21, 2002

(51) Int. Cl.
*G06F 17/30* (2006.01)

(52) U.S. Cl. ........................................ 707/101; 707/10

(58) Field of Classification Search ................ 707/102, 707/100, 101
See application file for complete search history.

(56) References Cited

U.S. PATENT DOCUMENTS

| | | | | |
|---|---|---|---|---|
| 5,710,900 | A | 1/1998 | Anand et al. | 395/339 |
| 5,721,903 | A | 2/1998 | Anand et al. | 395/605 |
| 5,761,650 | A | 6/1998 | Munsil et al. | 705/34 |
| 6,160,549 | A * | 12/2000 | Touma et al. | 715/762 |
| 6,269,393 | B1 | 7/2001 | Yost et al. | 709/201 |
| 6,330,007 | B1 | 12/2001 | Isreal et al. | 345/762 |
| 6,725,231 | B2 * | 4/2004 | Hu et al. | 707/102 |
| 6,826,578 | B2 * | 11/2004 | Brackett et al. | 707/104.1 |
| 6,906,810 | B2 * | 6/2005 | Senay et al. | 358/1.1 |
| 6,996,768 | B1 * | 2/2006 | Elo et al. | 715/500 |
| 7,039,871 | B2 * | 5/2006 | Cronk | 715/741 |
| 2001/0032217 | A1 * | 10/2001 | Huang | 707/513 |
| 2003/0237046 | A1 * | 12/2003 | Parker et al. | 715/513 |
| 2004/0205452 | A1 * | 10/2004 | Fitzsimons et al. | 715/500 |

OTHER PUBLICATIONS

Young-Gun Jang Intelligent HTML to VXML Conversion using Automatic Ojbect Extraction and Prior Structure Knowledge, Computation Intelligent and Security, vol. 2, pp. 1446-1451, Nov. 3-6, 2006.*

Sousa et al. Mapping rules to convert form ODL to XML-SCHEMA, Computer Science Society, pp. 133-141, Nov. 6-8, 2002.*

Imamura et al. Mapping between ASN.1 and XML, Application and the Internet, pp. 57-64, Jan. 8-12, 2001.*

Jain et al. Translating XSLT programs to Efficient SQL queries, International World Wide Web Conference, Proceedings of the 11th international conference on World Wide Web, pp. 616-626, 2002.*

Lee et al. NeT & CoT: translating relational schema to XML schema using sematic constraints, Conference on Information and Knowledge Management, Proceeding of the eleventh international conference on Information and Knowledge management, pp. 282-291, 2002.*

Ping et al. Migration of legacy web application to enterprise Java tm environment net.data to JSP tm transformation, IBM Centre of Advanced Studies Conference, Proceedings of the 2003 conference of hte Centre for Advanced Studies on Collaborative research, pp. 223-237, 2003.*

* cited by examiner

*Primary Examiner*—Shahid Alam
*Assistant Examiner*—Baoquoc N. To
(74) *Attorney, Agent, or Firm*—Schwegman, Lundberg, & Woessner, P.A.

(57) ABSTRACT

Report specification generators, interfaces, and methods are provided. Existing specification objects are selected from a data store. New specification objects are created as shell specification objects. Moreover, computations are selected from the data store. The specification objects, the shell specification objects, and the computations are organized within a grid. In one embodiment, the grid is used to generate a template report schema. In another embodiment, a preview tool populates the grid with report data in order to present a preview.

18 Claims, 3 Drawing Sheets

7,293,031 B1

REPORT SPECIFICATION GENERATORS AND INTERFACES

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, NCR Corp. All Rights Reserved.

FIELD OF THE INVENTION

The present invention relates to report specification generators and interfaces, and in particular to methods and systems that permit report specifications to be generated and developed using automated tools.

BACKGROUND OF THE INVENTION

In today's highly automated business environment, organizations are demanding more real time information to mine and analyze behaviors of their customers. This information permits organizations to develop better Customer Relationship Management (CRM) applications and Business Intelligence (BI) solutions to improve relationships with customers of the organizations and corresponding improve the revenues and/or profits of the organizations.

To facilitate better CRM and BI techniques, organizations have developed data warehouses, which organize and link important customer information from a variety of data stores in a centrally accessible data repository. The data warehouses can include information gathered from various online transaction processing (OLTP) applications that record transactions and/or behaviors of customers when the customers interact with the organizations in some way. Various data mining, Word Wide Web (WWW) mining, and Decision Support System (DSS) applications can be used against the data warehouse of an organization to create desired CRM applications.

Moreover, organizations deploy a variety of BI reports that allow the organization to use reporting tools, such as Online Analytical Processing (OLAP) tools (e.g., MicroStrategy, Cognos, and others) to create dimensions, metrics, filters, and templates associated with analyzing and viewing the organizations' data. The created dimensions, metrics, filters, and templates combine to form the BI reports that process against the organizations' data in order to display results in tables and/or graphs. Further, the dimensions, metrics, filters, and templates are stored in a metadata format for use by a specific OLAP tool. And, a schema defines the data format of the metadata. Since the metadata defines the aspects of a BI report, the metadata is a portion of information used when creating an OLAP application. A specific OLAP tool then processes the OLAP application.

Additionally, OLAP applications typically operate off of a multidimensional data store as opposed to a relational database. A multidimensional data store can consider each data hierarchy (e.g., product line, geography, sales region, time period, and the like) as an independent dimension. Also, an OLAP data store need not be as large as a conventional data warehouse, since not all transactional data is required for OLAP applications performing trend analysis.

Furthermore, OLAP applications can be used by organizations to analyze data warehouses for understanding and interpreting data. As is clear to one of ordinary skill in the art, well-developed OLAP applications assist an organization in creating better CRM techniques and BI solutions through the use of BI reports.

An important first step, in an organization's process of creating OLAP reports and OLAP applications, is gathering report specifications from a non-technical employee (e.g., business analyst) and providing the specifications to a technical employee. The specifications are textual descriptions defining an OLAP report's appearance and operation. Each step required in initially generating the specifications is inefficient, time consuming, prone to errors, and prone to misinterpretations. For example, before producing specifications potential consumers of the OLAP report are interviewed, findings/requirements are then documented, and the requirements are translated into hardware and software parlance.

Typically, non-technical employees have difficulty translating the specifications into hardware and software terminologies. Moreover, at the same time developers, who consume the specifications in order to produce a desired OLAP report, spend a significant amount of time reading and re-reading the specifications in an effort to understand what was intended by the original author of the specifications and/or to acquire sufficient enough detail to produce the OLAP report or other types of analytical reports for the original author.

As is apparent, there exists a need for providing techniques that better generate report specifications. Moreover, improved interfaces and methods to the specification gathering process are desirable in order to reduce development cycles associated with generating specifications for reports. With such techniques and tools, organizations can more timely and efficiently produce reports, and better utilize and develop an organization's knowledge store associated with gathering and generating specifications.

SUMMARY OF THE INVENTION

In various embodiments of the present invention report specification generator systems, interface systems, and methods are described. Report specifications are automatically formatted and generated using a variety of tools. In some cases a template report schema associated with the report specifications is automatically generated.

More specifically and in one embodiment of the present invention, a report specification generator system is provided. The specification generator system includes a layout tool and a generator tool. The layout tool is used for selecting and creating dimensions, metrics, filters, and computations from a data store and placing them in a layout format. The generator tool translates the selected dimensions, metrics, filters, and computations organized in the layout format into an intermediate data format for processing to one or more secondary data formats. Results such as scores from data mining models can also be used.

Another embodiment of the present invention, a report specification interface system is presented. The specification interface system includes, a selection tool, a computation tool, a template tool, and a placement tool. The selection tool selects specification objects from a data store. Furthermore, the computation tool selects computations from the data store. The template tool generates shell specification objects. Moreover, the placement tool permits the selected specification objects, the selected computations, and the generated shell specification objects to be organized in a grid.

In yet another embodiment of the present invention, a method to generate report specifications is described. A plurality of specification objects selected from a data store is received. Moreover, a plurality of shell specification objects and a plurality of computations are received. Furthermore, locations within a grid are received for each of the specification objects, each of the shell specification objects, and each of the computations. Next, a template report schema is generated from the grid.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Reports are embodied as report metadata that is processed by specific report tools to generate instances (e.g., results) of the reports. The instances of the reports can then be viewed and displayed in a variety of ways permitted by the specific report tools. Moreover, the specific report tools use the report metadata to query and obtain data embodied in an organization's data store (e.g., data warehouse, database, OLAP database, and others). In some cases, the report metadata also includes a schema that defines the data formats, elements, items, attributes, data store fields, data types, and the like of the report metadata.

As one of ordinary skill will further understand upon reading the various embodiments described in detail below, the present disclosure automates an organization's development cycle associated with gathering and generating report specifications. This is particularly well suited for OLAP reports and OLAP tools; however, the techniques presented herein can be also used with any business report, report tool, and/or analytical tool within the organization to automate the development cycle associated with gathering and generating report specifications.

Furthermore, and in more embodiments of the present invention, the various tools of the present disclosure are implemented as Graphical User Interface (GUI) tools using WWW pages within a WWW browser. Moreover, the data store is a Teradata warehouse, distributed by NCR Corporation of Dayton, Ohio. Furthermore, various CRM or BI applications/reports that can be automatically developed with the present invention are embodied within a Teradata product, distributed by NCR Corporation of Dayton, Ohio. Thus, various embodiments of the present invention can a Teradata product for retail decision reports and other BI reports used for manufacturing, communications, travel services, and the like. Of course it is readily apparent to one of ordinary skill in the art that any interface tool, data store, CRM application/report, or BI application/report can be used with the tenets of the present invention. All such implementations are intended to fall within the broad scope of the present disclosure.

Figure 1:
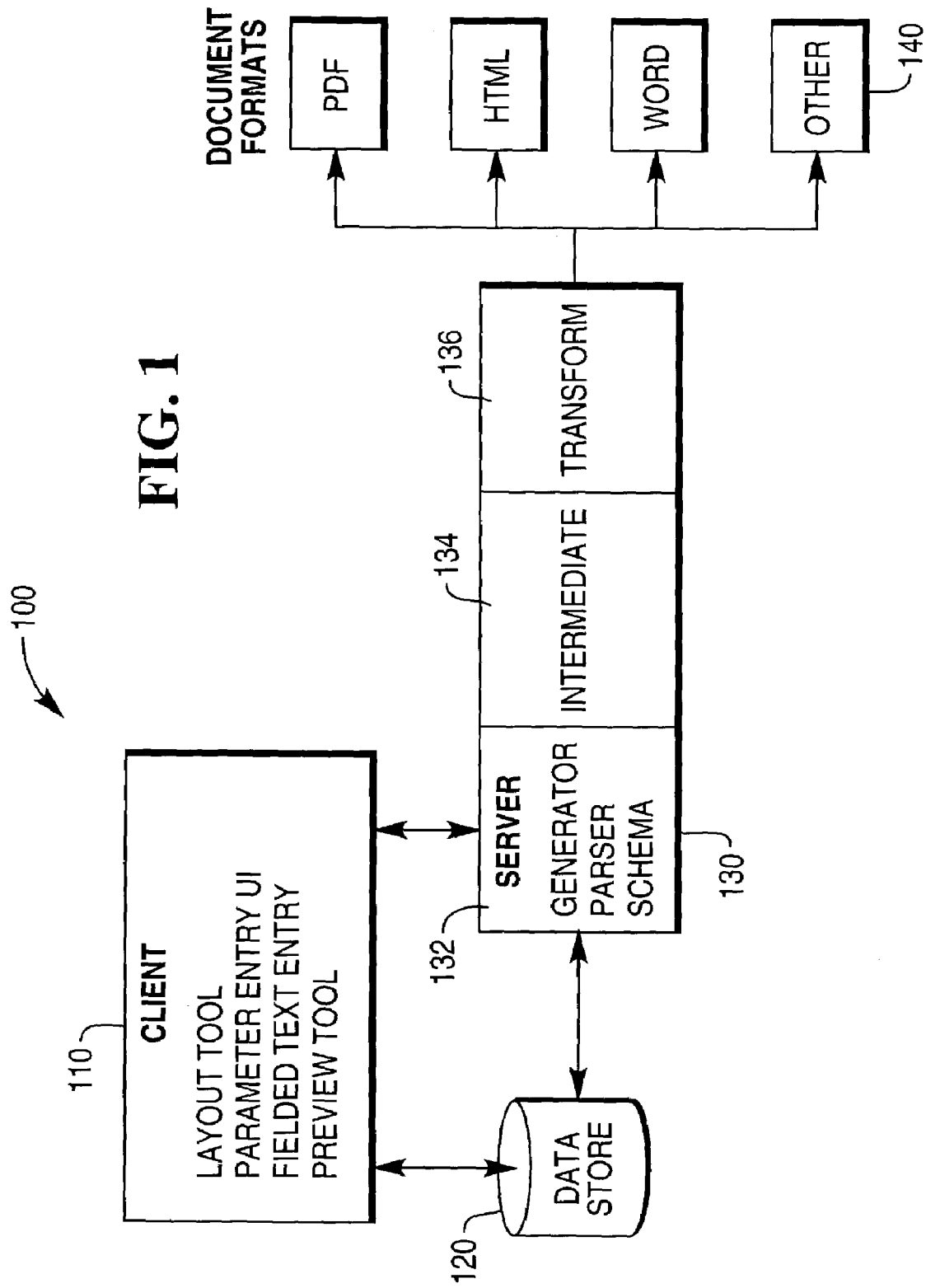
FIG. 1 is a diagram representing a report specification system, according to the teachings of the present invention.

FIG. 1 illustrates a diagram representing a report specification system 100, according to the teachings of the present invention. The report specification system 100 includes a client 110, a data store 120, and a server 130. The client 110, the data store 120, and the server 130 interface with one another in a networked environment (e.g., Local Area Network (LAN), Wide Area Network (WAN), Internet, and/or others).

The client 110 processes a layout tool, a parameter entry user interface (UI) tool, and fielded text entry tools. The layout tool includes a grid control that accepts drag and drop objects and a set of lists included in the data store 120. Dialogue boxes are linked to the objects and lists to provide detailed parameters and descriptions for each selected object or list. In some cases, the dialogue boxes also permit values assigned to object and list parameters to be modified.

The objects represent dimensions, metrics, filters, descriptive information, and the like for reports. The lists present all the dimensions, metrics, and filters that exist in a specified user's database. List can also represent aggregations of objects or computations, such as totals, standard deviations, maximum and minimum values, and the like. In one embodiment, a shell object is available for an end-user to temporarily create new objects (e.g., dimensions, filters, metrics, and the like), new lists, and/or new aggregations for a report that is being defined using the report specification system 100.

The objects and the lists can be graphically represented and presented to an end-user within the client 110 while processing the layout tool. The data store 120 includes existing objects and lists that are selectable for use by the layout tool. Existing Parameter values of existing objects can be altered using the parameter entry UI (e.g., dialogue boxes) tool that also processes within the client 110. Also, the fielded text entry tools can be used by the end-user to provide descriptive information about any end-user defined objects (e.g., shell objects for filters, dimensions, metrics, and the like) and end-user defined lists.

The end-user views and selects existing objects/lists and creates any new shell objects/lists that are necessary and uses the grid controls of the layout tool to place the objects in desired locations within a grid. Once done, and in one embodiment, the grid and its accompanying objects/lists are transmitted to the server 130, as a schema that defines the desired report that was interactively built on the client 110. The server 132 includes a generator/parser/intermediate schema 132 for translating the grid into an intermediate data format 134. Moreover, one or more transformation or rendering applications 136 can then process the intermediate format to a variety of other document formats 140 (e.g., Portable Document Format (PDF), Hypertext Markup Language (HTML), format, a word processing format, or any other desired data format).

In some embodiments, the intermediate format is Extensible Markup Language (XML), and the transformation applications are Extensible Style Sheets Language Transformation (XSLT) applications. Of course a variety of intermediate formats and transformation applications can be used and all such formats and transformation applications are intended to fall within the broad scope of the present disclosure.

An end-user interacting with the report specification system 100 of FIG. 1, interactively receives information regarding existing objects and lists from the data store 120 via the client 110. In some instances, this information can be graphical, audible; and/or textual. The information can be presented in a variety of manners, such as by placing a cursor over an object, and the like. The information assists the end-user in selecting the appropriate objects from the data store 120. Moreover, new shell objects, can be created by the end-user to define objects that do not yet exist. The objects are then placed in a grid and a schema for the objects and their locations within the grid are generated. The schema can also be generated and passed in XML.

The schema is then supplied to the server 132, where it is parsed, and generated into an intermediate schema 134. Next, if desirable, one or more transformation applications 136 translate the intermediate schema to one or more additional document formats 140. In this way, an end-user develops specifications and produces specifications and schemas associated with reports by interactively using the tools of the present disclosure. Furthermore, in some embodiments, a preview tool can be used to populate values for objects/lists within the end-user's grid layout of objects/lists with data acquired from the data store 120. This permits the end-user to preview what information is likely to be returned when executing a report defined by the end-user and can serve as a final check before determining that the correct objects have been chosen by the end-user.

Additionally, the fielded text entry tools, can be used to define parameters for any end-user created shell objects. Since these parameters are ordered and fielded, existing objects within the data store 120 can be checked for existing objects having similar parameter configurations. Any matching objects along with their descriptions can be presented to the end-user as potential objects for the end-user to use, rather, than custom developing additional objects in the data store 120. In this way, re-use of objects can be integrated into the process and made more automatic, so that an organization's knowledge store (associated with generating report specifications and reports and understanding the data stored) is being adequately leveraged, recorded, and mined from the data store 120.

The complete specifications for the desired report can be translated to any desired document format 140 and then sent electronically or printed on print media. In some instances, the desired report associated with the developed specifications is fully developed when the specifications are completed generated. In other instances the desired report is associated with shell objects that are not yet developed. In these instances, the specifications serve as technical guidelines for a developer to implement the shell objects.

As one of ordinary skill in the art now appreciates, the report specification system 100 of FIG. 1 enables end-users to document their specifications for reports (e.g., OLAP reports, and others) by using tools that minimize the necessity for manual entry of narrative text by the end-users. Moreover, the specifications are collected as via interactive tools, and the specifications are provided in a format that permits other applications to readily consume and use the specifications (e.g., XML).

Figure 2:
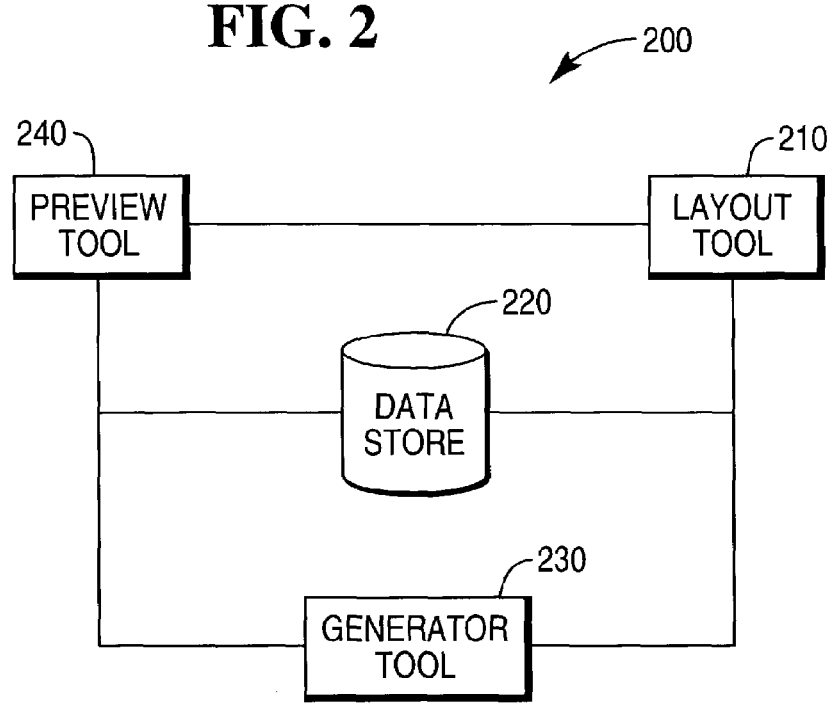
FIG. 2 is a diagram representing a report specification generator system, according to the teachings of the present invention.

FIG. 2 is a diagram illustrating a report specification generator system 200, according to the teachings of the present invention. The report specification generator system 200 includes a layout tool 210, a data store 220, a generator tool 230, and, in some instances, a preview tool 240. The data store 220 includes specification objects, such as report metrics, report dimensions, report filters, and the like. The data store 220 also includes standard computations such as totals, standard deviations, maximum and minimum value calculations, and the like.

The layout tool 210 can be implemented within a browser (e.g., WWW browser), a custom-developed GUI application, or as custom modifications to existing report tools (e.g., OLAP tools). The layout tool 210 permits the selection of the metrics, the dimensions, the filters, and the computations from the data store 220, and allows these objects to be placed in a layout format as a basis for forming a desired report. The layout format records presentation information associated with the objects, so that the selected objects are presented in a manner desired. For example, the layout format records location information for the objects within a display screen or grid. The location information can include coordinate data and be based on relative positions of the objects with respect to each other. The layout tool 210 is interactively and iteratively processed to produce the layout format.

The generator tool 230 translates the selected dimensions, metrics, filters, and computations that are organized in the layout format into an intermediate data format for processing to one or more secondary data formats. In one embodiment, the intermediate format is XML and the layout format is represented as an XML schema, which can then be translated or rendered to a variety of the secondary data formats (e.g., PDF, HTML, word processing format, and the like) by using XSLT applications. In some cases the generator tool 230 is itself an XSLT applications, such as when the layout tool 210 provides the layout format as an XML schema. In other cases, the generator tool 230 includes a number of applications integrated into existing or custom-developed report tools that translate the layout format to an intermediate format and provide rendering to a variety of the secondary formats.

In one embodiment, the preview tool 240 acquires report data from the data store that matches objects and object parameter values selected by the layout tool 210. The data is then presented to an end-user as a preview of what a desired report might look like with the current object selections and layout format being previewed by the end-user. Thus, the end-user can process the preview tool 240 as a way to determine if the selected objects, values of parameters for selected objects, and the layout of the objects are valid to the end-user. If changes are desired, then the end-user can interactively and iteratively access and process the layout tool 210 until a desired layout format has been achieved.

Descriptive information and technical information are associated with each of the objects, and available when accessing the proper fields and/or methods of the objects. Therefore, the specifications can be automatically generated from the final layout format in a readable format that is desired by technical developers. The readable format can be defined by using the intermediate schema, and the automated generated specifications can be rendered to any of the secondary data formats (including to a print media via a printer device) using the generator tool 230.

In some embodiments, the layout tool 210 includes or is otherwise interfaced to a number of additional tools, such as a parameter-modifying tool, and a fielded text entry tool. The parameter-modifying tool permits object parameter values to be modified from what is originally acquired from the data store 220. The fielded text entry tool identifies new parameter information associated with newly desired objects. By restricting entry to defined fields, the number and ordering of parameters to a new object can be ascertained and used to compare against other objects with similar parameter configurations in the data store 220. Accordingly, an end-user object can be altered to potential existing objects before requesting new objects. This facilitates better reuse of objects throughout the organization. The fielded text entry tool also permits the generation of specifications for newly requested objects.

Newly desired objects can be created using a shell object tool that serves as a template or placeholder for the end-user desired object. The shell object tool interacts with the layout tool 210 and the preview tool 240 to provide the end-user with as much information as possible to determine if the newly desired object is needed and how it will interact within the layout format of the desired report.

As one of ordinary skill in the art now appreciates, specifications can be seamlessly and automatically generated for an end-user by interactively processing the tools (e.g., 210, 230, and 240) of the report specification generator system 200 presented in FIG. 2. Moreover, in some instances, the actual report desired by the end-user and defined by the specifications can be automatically generated and provided to the end-user, such as when each of the selected objects are existing objects within the data store 220. This is a significant improvement over conventional manual specification processes where little to no reuse of existing knowledge is obtained or used. With various embodiments of the report specification generator system 200, existing data is not only reused and automatically configured, but also, in some cases, existing data can be suggested as better alternatives to the end-user to encourage reuse.

Figure 3:
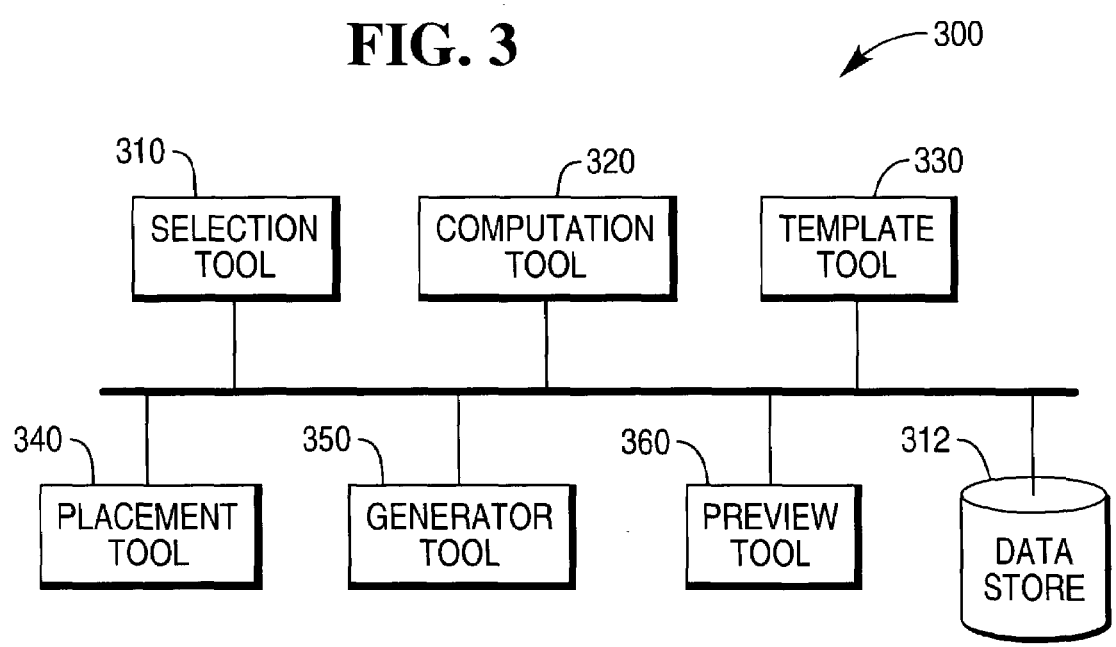
FIG. 3 is a diagram representing a report specification interface system, according to the teachings of the present invention.

FIG. 3 illustrates a diagram representing a report specification interface system 300, according to the teachings of the present invention. The report specification interface system 300 includes a selection tool 310, a report data store 312, a computation tool 320, a template tool 330, and a placement tool 340. In various embodiments, the report specification interface system 300 also includes a generator tool 350 and a preview tool 360. The tools and the data store (e.g., 310-360) are networked together. Optionally, some of the tools can be built directly into the data store 312 (not depicted in FIG. 3). The tools (e.g., 310 and 320-360) can be implemented inside a browser (e.g., WWW browser), custom-developed GUI applications, and/or integrated into commercially available report tools (e.g., OLAP tools). Moreover, a number of the tools (e.g., 310 or 320-360) can be integrated with one another to provide combined features. Accordingly, FIG. 3 is presented for illustrative purposes only and is not intended to limit the present disclosure.

The selection tool 310 is used to select specification objects from the data store 312. The specification objects include report metrics, report filters, report dimensions, and the like. The specification objects can include zero or more parameters having assigned values that are used by the specification objects. The specification objects can also be aggregations of objects. Furthermore, the selection tool 310 can permit the values assigned to any parameters of the selected specification objects to be modified.

The computation tool 320 is used to select computations (e.g., totals, standard deviations, maximum and minimum value calculations, averages, means, and the like) from the data store 312. The computation tool permits parameter values to be assigned by an end-user that match a selected computation that the end-user desires to be performed.

The template tool 330 is used to generate shell specification objects that an end-user believes does not exist in the data store 312. Thus, shell objects can be created by the end-user and defined using fielded and interactive input areas. Once an end-user is completed creating a shell object, the template tool 330 queries the data store 312 in order to determine if existing specification objects are available for use by the end-user that match with the shell object. Further, the end-user need not be aware of the presence of the existing specification objects when creating the shell objects.

The placement tool 340 permits the selected specification objects, the selected computations, and the generated shell specification objects to be organized in a grid. The grid can be mapped a print media or a browser page media. Once the locations of the objects and the computations are known within the grid, then the grid can be rendered to an intermediate format for any desired subsequent processing. Also, the locations need not be absolute locations within the grid since relative locations can be used to show distances between the objects and computations relative to one another. In some embodiments, the placement tool 340 is also be referred to as a layout tool.

In some embodiments, a generator tool 350 can be used to translate the organized grid into a template report schema for a desired report. This can be done, in a number of ways. For example, the placement tool 340 can provide a schema for the grid, where the generator tool 350 includes a parser and an intermediate schema that translates the grid schema to an intermediate schema. In some embodiments, the intermediate schema is an XML schema. The intermediate schema can then be used in combination with translation applications (e.g., XSLT applications) to render the intermediate schema to a variety of secondary schemas. In this way, a report desired by an end-user is partially, or in some instances, completely defined by the template report schema.

Additionally, in one embodiment, a preview tool 360 can be used in combination with the other tools (e.g., 310, 320-350) in order to populate the object with data values acquired from the data store 312. This permits an end-user to preview how the report is progressing and to determine whether certain selections were appropriate. Report data is acquired based on object names and fields within the data store 312. Shell objects are displayed without populated data values.

As one of ordinary skill now understands upon comprehending the discussion of FIG. 3, various tools (e.g., 310 and 320-360) can be provided for an improved report specification interface system 300. The improved report specification interface system 300 permits a non-technical individual to dynamically interact with the various tools to produce report specifications and report schemas. The report specification interface systems 300 implemented by FIG. 3 reuses an organization's existing specification objects, thereby leveraging the organization's knowledge store and reducing the development cycle associated with gather specifications and developing reports that match the specifications.

Figure 4:
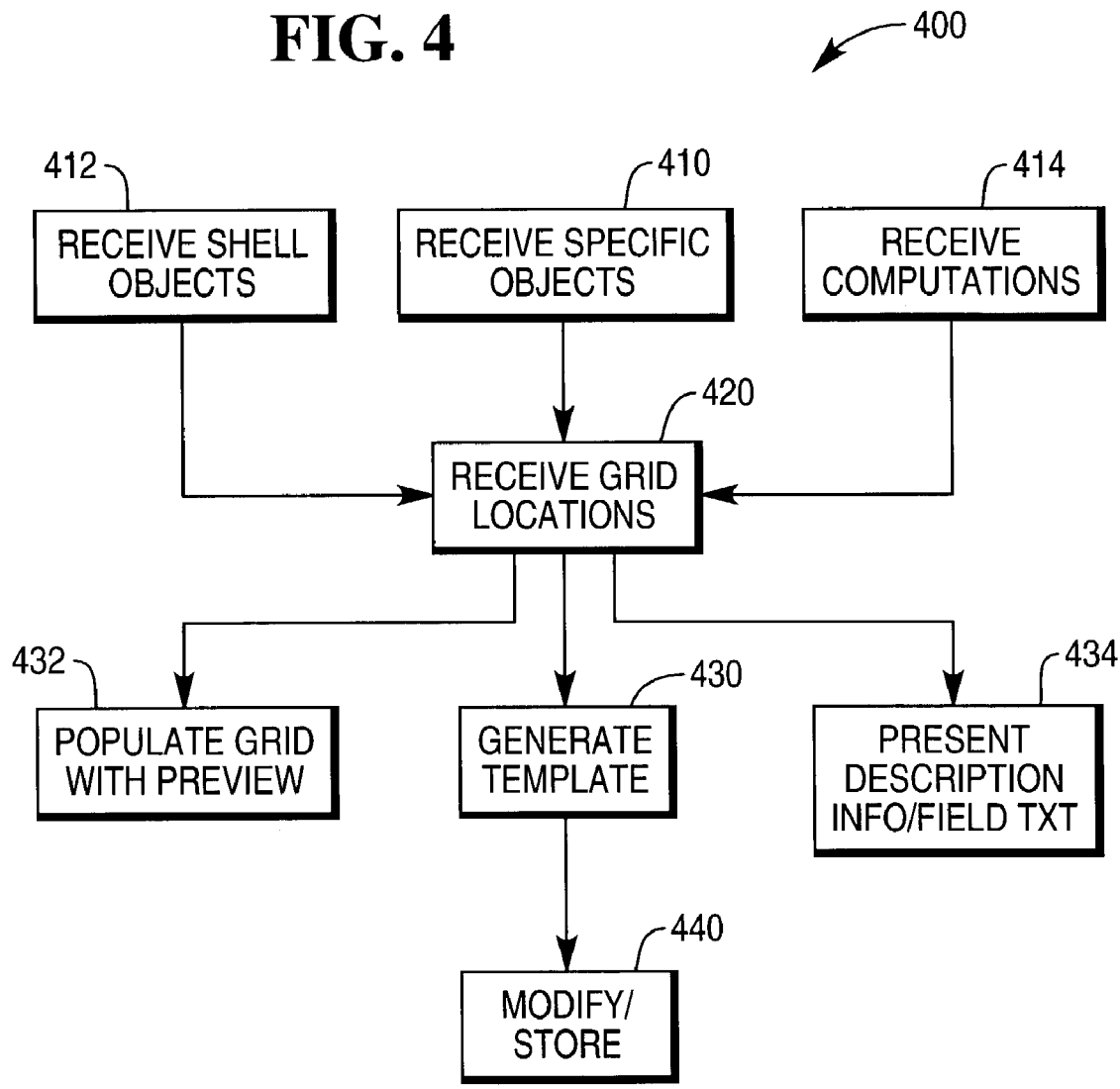
FIG. 4 is a flowchart representing a method of generating report specifications.

FIG. 4 illustrates a flowchart representing one method 400 for generating report specifications, according to the teachings of the present invention. The method 400 can be implemented in any network configuration, where a variety of applications or tools and a data store communicate with one another in order to implement method 400. Any such configuration of applications and/or tools that implement method 400 is intended to fall within the broad scope of the present disclosure.

Initially, in 410, specification objects are received from a data store. The labels for columns/rows are different than the field names. For example, the field name for summing all sales can be named "SUM_SALE," but the column name in the report can be referred to with a label named "$ SALES." The specification objects represent report dimensions, report metrics, and report filters associated with previous reports of an organization. Shell objects can also be received in 412. The shell objects represent non-existent objects that need to be developed for purposes of the desired report. The shell objects can be received from a shell-generating tool, and can include parameter information, which is presented as fielded text input areas to an end-user for receiving descriptive information about the shell objects. In some cases, the descriptive information includes parameter ordering and parameter type information. In these cases, the shell-generating tool uses the descriptive information to locate and suggest similar objects that already exist in the data store. Thus, reuse of the organization's existing specification objects is encouraged and monitored to leverage the existing resources of the organization.

Similarly, in 414, computations selected from the data store are received based on interactions with ant end-user. The computations represent calculations that the end-user desires to be performed on any desired report being defined. The computations can include averages, totals, means, maximum and minimum value calculations, standard deviations, and others. The parameters identifiers associated with operands to the computations can be provided by the end-user to match the desired report being defined. The computations can also be performed within the data store.

In 420, locations for each of the selected specification objects, the shell specification objects, and the computations are received and associated within a grid. In some instances, the locations are absolute positions within the grid, and in other instances, the locations are relative positions within the grid. The grid can be based on print media or page media dimensions, or in the case of relative positions, the grid can be based on indeterminate dimensions and dynamically rendered to a fixed dimension using the relative positions.

In 430, a template report schema is generated using the grid. The template report schema can be a partially defined report that was automatically generated through interactions with tools that implement method 400. In some instances, the template report schema can be a final report schema, such as when an end-user uses only existing specification objects from the data store and has not included any shell specification objects.

Another embodiment, in 432, permits the grid to be populated with report data from the data store when a preview request is received. The populated grid provides an end-user with a preview of what the desired report may look like based on the current selected specification objects, current selected computations, and current created shell specification objects. Any shell specification objects will appear without any populated data within the grid, since the data fields associated with the shell specification objects may not yet exist in the data store.

In still another embodiment, in 434, descriptive information for a number of the specification objects is presented to an end-user. The descriptive information permits the end-user to determine whether the viewed specification object is acceptable for purposes of the end-user's desired report. Moreover, in some cases, the end-user provides the descriptive information through fielded text input areas, in order to define parameter information associated with desired shell specification objects.

Once the grid is developed and the desired template achieved, the shell specification objects can be stored or recorded in the data store, as depicted in 440. In this way, at some later point in time the shell specification objects can be linked to the developed specification objects, and used to assist end-users that have an interest in the shell specification objects for purposes of their reports. Furthermore, in 440, the values assigned to parameters of the objects can be modified when the end-user provides a request to modify the values of the parameters. Also, it is readily apparent to one of ordinary skill in the art that the shell specification objects and modified values for parameters of objects can be stored and modified prior to generating the template report schema, although not depicted in FIG. 4.

It is now apparent to one of ordinary skill in the art, that the above disclosed systems and methods improve the process of gathering and developing report specifications. The disclosed systems and methods are interactive and automatic, thereby permitting non-technical staff to fully define and develop specifications, and in some cases reports, without the assistance of technical staff. Moreover, the non-technical staff, in some embodiments, can automatically preview the developing specifications and reports using existing report data. Therefore, the development cycles associated with gathering and implementing report specifications are reduced, and the knowledge of an organization is more completely leveraged by implementing the teachings of the present disclosure.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented report specification generator system, comprising:

a layout tool that processes on a machine and for selecting, labeling, and creating multiple dimensions, metrics, filters, and computations from a data store and placing them in a layout format, wherein a user interactively views existing objects, selects the existing objects, and creates new objects having the multiple dimensions, the metrics, the filters, and the computations and then uses grid controls of the layout tool to place the objects in desired locations within a grid; and a generator tool that processes on a machine for translating the selected multiple dimensions, metrics, filters, and computations organized from the layout format into a intermediate data format for processing to one or more secondary data formats that conform to the locations within the grid, and wherein the one or more secondary formats are instances of a report associated with the layout format, wherein the intermediate data format is Extensible Markup Language (XML) format and the generator tool is an Extensible Style Sheets Language Transformation (XSLT) application, and wherein the grid maps to print media or browser page media and the locations relative locations within the grid used to show distances between the existing and the new objects and the computations relative to one another.

2. The report specification generator system of claim 1, further comprising a preview tool for previewing the layout format with report data acquired from the data store.

3. The report specification generator system of claim 1, wherein the layout tool is a Graphical User Interface tool.

4. The report specification generator system of claim 1, wherein the layout tool is interactively and iteratively processed to produce the layout format.

5. The report specification generator system of claim 1, wherein the generator tool produces a schema for the layout format, where the schema is generated to the intermediate data format.

6. A computer-implemented report specification interface system, comprising:
 a selection tool that processes on a machine and that selects specification objects from a data store;
 a computation tool that processes on the machine and that selects computations from the data store;
 a template tool that processes on the machine and that generates shell specification objects in an intermediate data format from which the shell specification objects is rendered to other different data formats, wherein the intermediate data format is Extensible Markup language (XML) format and a generator tool is an Extensible Style Sheets Language Transformation XSLT application; and
 a placement tool that processes on the machine and that permits the selected specification objects, the selected computations, and the generated shell specification objects to be organized in a grid, and wherein a user dynamically and interactively processes the selection, computation, template, and placement tool to produce report specifications and wherein the grid maps to print media or browser page media and locations defined within the grid are relative locations within the grid used to show distances between the shell specification objects and the computations relative to one another.

7. The report specification interface system of claim 6, further comprising a generator tool that translates the organized grid into a template report schema.

8. The report specification interface system of claim 6, further comprising a preview tool that populates the organized grid with report data from the data store.

9. The report specification interface system of claim 6, wherein the specification objects include at least one of a report dimension, a report metric, and a report filter.

10. The report specification interface system of claim 6, wherein the specification objects include aggregated objects from the data store.

11. The report specification interface system of claim 6, wherein the specification objects include parameters and the selection tool permits values assigned to the parameters to be modified.

12. The report specification interface system of claim 6, wherein the system is processed within a browser.

13. A method to generate report specifications, comprising:
 receiving a plurality of specification objects selected from a data store;
 receiving a plurality of shell specification objects;
 receiving a plurality of computations selected from the data store;
 receiving locations within a grid for each of the specification objects, each of the shell specification objects, and each of the computations, and wherein the grid maps to print media or browser page media and the locations defined within the grid are relative locations within the grid used to show distances between the specification objects, the shell specification objects and the computations relative to one another; and
 generating a template report schema from the grid using an Extensible Style Sheets Transformation (XSLT) application, wherein the template report schema is in an Extensible Markup Language (XML) data format that is different from a data format associated with the specification objects, and wherein receipt of the plurality of specification objects, shell specification objects, and computations are received in response to dynamic interactions with a user, and wherein the XML data format is further processed to a desired or target format in response to direction from the user.

14. The method of claim 13 further comprising, populating the grid with report data from the data store when a preview request is received.

15. The method of claim 13 further comprising, presenting descriptive information for a number of the specification objects when a descriptive request is received.

16. The method of claim 13 further comprising, presenting fielded text input areas for receiving descriptive information about the shell specification objects.

17. The method of claim 13 further comprising, receiving modified values assigned to parameters of the specification objects.

18. The method of claim 13 further comprising storing the shell specification objects in the data store once the template report schema is generated from the grid.

* * * * *